United States Patent
Campbell et al.

(10) Patent No.: US 11,023,668 B2
(45) Date of Patent: Jun. 1, 2021

(54) ENRICHED COMPOUND DATA OBJECTS

(71) Applicant: Microsoft Technology Licensing, LLC, Redmond, WA (US)

(72) Inventors: John Campbell, Woodinville, WA (US); Benjamin Edward Rampson, Woodinville, WA (US); Christian Canton, Bellevue, WA (US); Carlos Augusto Otero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/340,321

(22) Filed: Nov. 1, 2016

(65) Prior Publication Data

US 2017/0124052 A1    May 4, 2017

Related U.S. Application Data

(60) Provisional application No. 62/357,327, filed on Jun. 30, 2016, provisional application No. 62/249,869, (Continued)

(51) Int. Cl.
   *G06F 40/18*    (2020.01)
   *G06N 20/00*    (2019.01)
   *G06F 3/0482*   (2013.01)

(52) U.S. Cl.
   CPC ............ *G06F 40/18* (2020.01); *G06F 3/0482* (2013.01); *G06N 20/00* (2019.01)

(58) Field of Classification Search
   None
   See application file for complete search history.

(56) References Cited

U.S. PATENT DOCUMENTS 5,255,356 A   10/1993   Michelman et al.
5,317,686 A    5/1994   Salas et al.
              (Continued)

FOREIGN PATENT DOCUMENTS

CN    1348135 A    5/2002
WO     157744      8/2001
WO    2015065864   5/2015

OTHER PUBLICATIONS

Itoh et al., "A Framework for Constructing Coordinated Multiple 3D Visualizations on Excel," 2009 13th International Conference Information Visualisation, copyright 2009 IEEE, p. 162-170. (Year: 2009).*

(Continued)

*Primary Examiner* — Amelia L Tapp
(74) *Attorney, Agent, or Firm* — NovoTechIP International PLLC

(57) ABSTRACT

The present disclosure relates to enriching a compound object with data provided by a third party service, database, or local database. In some embodiments, this is performed by receiving an entry of a value in a cell of a spreadsheet; determining whether the value is related to information provided by a service; based on a determination that the value is related to information provided by the service, selecting the service; displaying a field selection user interface; receiving a selection of one or more fields from the field selection user interface; receiving one or more values associated with the selected one or more fields; and enriching a compound object based on the selected one or more fields and associated one or more values.

19 Claims, 10 Drawing Sheets

Related U.S. Application Data filed on Nov. 2, 2015, provisional application No. 62/357,284, filed on Jun. 30, 2016, provisional application No. 62/249,884, filed on Nov. 2, 2015, provisional application No. 62/357,292, filed on Jun. 30, 2016.

(56) References Cited

U.S. PATENT DOCUMENTS

| | | | |
|---|---|---|---|
| 5,510,980 A | 4/1996 | Peters | |
| 5,548,703 A * | 8/1996 | Berry | G06F 3/0481 715/853 |
| 5,890,174 A | 3/1999 | Khanna et al. | |
| 5,933,638 A | 8/1999 | Cencik | |
| 5,983,268 A * | 11/1999 | Freivald | G06F 16/957 709/218 |
| 6,138,130 A | 10/2000 | Adler et al. | |
| 6,292,811 B1 | 9/2001 | Clancey et al. | |
| 6,317,758 B1 | 11/2001 | Madsen | |
| 6,377,965 B1 | 4/2002 | Hachamovitch et al. | |
| 6,606,633 B1 | 8/2003 | Tabuchi | |
| 6,631,497 B1 | 10/2003 | Jamshidi et al. | |
| 6,640,234 B1 | 10/2003 | Coffen | |
| 6,701,485 B1 | 3/2004 | Igra et al. | |
| 6,920,608 B1 * | 7/2005 | Davis | G06F 40/14 715/209 |
| 6,986,099 B2 | 1/2006 | Todd | |
| 6,988,241 B1 | 1/2006 | Guttman et al. | |
| 7,007,033 B1 | 2/2006 | Rothschiller et al. | |
| 7,076,491 B2 * | 7/2006 | Tsao | G06F 8/71 707/999.1 |
| 7,099,890 B2 | 8/2006 | Cahill et al. | |
| 7,350,141 B2 | 3/2008 | Kotler et al. | |
| 7,424,668 B2 | 9/2008 | DeSpain | |
| 7,451,397 B2 | 11/2008 | Weber et al. | |
| 7,461,077 B1 * | 12/2008 | Greenwood | G06F 3/0482 |
| 7,647,551 B2 | 1/2010 | Vigesaa et al. | |
| 7,735,003 B1 | 6/2010 | Hearn et al. | |
| 7,761,782 B1 | 7/2010 | Warren et al. | |
| 7,962,436 B2 | 6/2011 | Brelage et al. | |
| 8,091,024 B2 | 1/2012 | Graeber | |
| 8,166,385 B2 | 4/2012 | Garcia-Molina et al. | |
| 8,370,750 B2 * | 2/2013 | Adachi | G06F 8/00 715/738 |
| 8,601,361 B2 | 12/2013 | Berger et al. | |
| 8,640,022 B2 | 1/2014 | Waldman et al. | |
| 9,020,999 B2 | 4/2015 | Rai | |
| 9,098,484 B2 | 8/2015 | Viry | |
| 9,798,889 B1 | 10/2017 | Karpel et al. | |
| 10,311,141 B1 | 6/2019 | Olkin | |
| 10,331,771 B2 * | 6/2019 | Maresca | G06F 9/543 |
| 2003/0004853 A1 | 1/2003 | Ram et al. | |
| 2003/0182413 A1 * | 9/2003 | Allen | G06Q 30/06 709/223 |
| 2005/0097464 A1 | 5/2005 | Graeber | |
| 2005/0119990 A1 * | 6/2005 | Lee | G06F 16/9577 |
| 2006/0048044 A1 | 3/2006 | Genesereth et al. | |
| 2006/0179012 A1 | 8/2006 | Jacobs | |
| 2006/0206808 A1 * | 9/2006 | Jasthi | G06F 16/84 715/234 |
| 2006/0212469 A1 | 9/2006 | Babanov et al. | |
| 2007/0050702 A1 * | 3/2007 | Chopin | G06F 17/2247 715/202 |
| 2007/0078872 A1 | 4/2007 | Cohen | |
| 2007/0136652 A1 * | 6/2007 | Ellis | G06F 17/246 715/210 |
| 2008/0016436 A1 | 1/2008 | Liu et al. | |
| 2008/0028288 A1 | 1/2008 | Vayssiere et al. | |
| 2008/0046804 A1 | 2/2008 | Rui et al. | |
| 2008/0134089 A1 * | 6/2008 | Adachi | G06F 3/0481 715/810 |
| 2008/0215959 A1 | 9/2008 | Lection | |
| 2009/0006466 A1 * | 1/2009 | Ellis | G06F 40/18 |
| 2009/0044090 A1 | 2/2009 | Gur et al. | |
| 2009/0160861 A1 | 6/2009 | Nakano | |
| 2009/0307190 A1 * | 12/2009 | Maresca | G06F 9/543 |
| 2010/0083079 A1 | 4/2010 | Rapp et al. | |
| 2010/0131570 A1 | 5/2010 | Weinberg | |
| 2011/0022629 A1 | 1/2011 | Glover | |
| 2011/0314365 A1 | 12/2011 | Messerly | |
| 2012/0151315 A1 | 6/2012 | Campbell et al. | |
| 2012/0192050 A1 | 7/2012 | Campbell et al. | |
| 2012/0324421 A1 | 12/2012 | Boeckenhauer et al. | |
| 2013/0036346 A1 | 2/2013 | Cicerone | |
| 2013/0067305 A1 | 3/2013 | Golan | |
| 2013/0110884 A1 | 5/2013 | Eakins | |
| 2013/0298002 A1 | 11/2013 | Viry | |
| 2014/0074878 A1 | 3/2014 | Bomea et al. | |
| 2014/0122516 A1 | 5/2014 | Brewer et al. | |
| 2014/0359417 A1 | 12/2014 | Bar-On | |
| 2014/0372854 A1 | 12/2014 | Otero et al. | |
| 2014/0372857 A1 | 12/2014 | Otero et al. | |
| 2014/0372952 A1 | 12/2014 | Otero et al. | |
| 2015/0019540 A1 | 1/2015 | Ganjam et al. | |
| 2015/0142418 A1 | 5/2015 | Byron | |
| 2015/0161250 A1 | 6/2015 | Elbaz | |
| 2015/0242093 A1 | 8/2015 | Yost et al. | |
| 2016/0070733 A1 | 3/2016 | Gould | |
| 2016/0117412 A1 | 4/2016 | Mungi et al. | |
| 2016/0224536 A1 | 8/2016 | Thomas | |
| 2017/0124049 A1 | 5/2017 | Campbell et al. | |
| 2017/0124050 A1 | 5/2017 | Campbell et al. | |
| 2017/0124051 A1 | 5/2017 | Campbell et al. | |
| 2017/0124053 A1 | 5/2017 | Campbell et al. | |
| 2017/0124054 A1 | 5/2017 | Campbell et al. | |
| 2017/0337040 A1 | 11/2017 | Salvi et al. | |
| 2020/0202069 A1 | 6/2020 | Campbell et al. | |

OTHER PUBLICATIONS

PCT International Preliminary Report on Patentability in PCT/US2016/060188, dated Feb. 12, 2018, 8 pages.
U.S. Appl. No. 15/340,422, Office Action dated Feb. 22, 2018, 10 pages.
U.S. Appl. No. 15/340,187, Office Action dated May 18, 2018, 32 pages.
PCT International Preliminary Report on Patentability in PCT/US2016/060025, dated May 8, 2018, 16 pages.
PCT International Preliminary Report on Patentability in PCT/US2016/060180, dated May 8, 2018, 15 pages.
PCT International Preliminary Report on Patentability in PCT/US2016/060190 dated May 8, 2018, 9 pages.
U.S. Appl. No. 15/340,422, Amendment and Response filed May 22, 2018, 18 pages.
European Communications in Application 16798045.7, dated Jun. 8, 2018, 4 pages.
Robin Abraham and Martin Erwig, How to communicate unit error messages in spreadsheets, 30 ACM SIGSOFT Software Engineering Notes, pp. 1-5, 2005.
U.S. Appl. No. 15/340,422, Office Action dated Jun. 13, 2018, 15 pages.
Wilbert O. Galitz, The Essential Guide to user Interface Design 535, 2nd edition, Wiley, 2002, 786 pages.
"Setting up Excel Spreadsheets for Single Item or Compound Object Metadata", Published on: Sep. 7, 2015, 6 pages, available at: http://www.nyheritage.org/sites/default/files/docs/MetadataExcel.pdf.
An Introduction to Data Validation in Excel, Published on: Mar. 15, 2014, http://trumpexcel.com/2014/03/learn-all-about-data-validation-in-excel/, 4 pages.
Canton et al., "Compound Data Types", Oct. 2, 2015, 16 pages.
Canton et al., "Condensed Core Design", Jul. 30, 2015, 312 pages.
Canton et al., "Rich Data Types", Jul. 30, 2015, 217 pages.
Chang, et al., "A spreadsheet model for using web service data", In Proceedings of IEEE Symposium on Visual Languages and Human-Centric Computing, Jul. 28, 2014, 8 pages.
Chang, et al., "Creating interactive web data applications with spreadsheets", In Proceedings of the 27th annual ACM symposium on User interface software and technology, Oct. 5, 2014, pp. 87-96.

(56) References Cited

OTHER PUBLICATIONS

Create an Excel Drop Down list with Search Suggestions, Published on: Oct. 19, 2013, http://trumpexcel.com/2013/10/excel-drop-down-list-with-search-suggestions/, 11 pages.
French, Ted, "Convert Measurements in Excel", Published on: Mar. 18, 2011, http://spreadsheets.about.com/od/excel2010functions/ss/2011-03-18-Convert-Measurements-In-Excel-2010.htm, 4 pages.
Hoydahl, Jan, "Cominvent AS—Enterprise Search Consultants", Published on: Jan. 25, 2012, http://www.cominvent.com/2012/01/25/super-flexible-autocomplete-with-solr/, 4 pages.
In-Cell Dropdown and Validation in Spreadsheets, Published on: Aug. 26, 2010, http://googledrive.blogspot.in/2010/08/in-cell-dropdown-and-validation-in.html, 27 pages.
Levoy, Marc, "Spreadsheets for Images", In Proceedings of 21st International ACM Conference on Computer Graphics and Interactive Techniques, Jul. 24, 1994, 8 pages.
Lim, Jon, "Google Spreadsheets: COUNT with Multiple Values in Cells", Published on: Apr. 7, 2014, http://jonlim.ca/2014/04/google-spreadsheets-count-multiple-values-cells/, 5 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
PCT International Search Report in PCT/US2016/060190, dated Feb. 9, 2017, 13 pages.
Kongdenfha et al., "Rapid development of spreadsheet-based web mashups", International World Wide Web Conference 18th ACM, Madrid, Apr. 20, 2009, 10 pages.
PCT International Search Report in PCT/US2016/060188, dated Feb. 15, 2017, 13 pages.
Bakke et al., "A spreadsheet-based user interface for managing plural relationships in structured data", Human Factors in Computing Systems, May 7, 2011, 10 pages.
Kapros et al., "Updating database schemas without breaking the UI: modeling using cognitive semantic categories" Proceedings of the 2014 ACM Sigchi Symposhium on Engineering Interactive Computing System, Jun. 17, 2014, 9 pages.
PCT International Search Report in PCT/US2016/060025, dated Apr. 7, 2017, 23 pages.
Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgl?artcile=2712&context=etd, pp. 1-7, 15-26.
Chang, et al., "A Spreadsheet Model for Handling Streaming Data", In Proceedings of the 33rd Annual ACM Conference on Human Factors in Computing Systems, Apr. 18, 2015, 4 pages.
PCT Invitation to Pay Additional Fees in PCT/US2016/060180, dated Feb. 9, 2017, 8 pages.
PCT International Search Report and Written Opinion in PCT/US2016/060180, dated Jul. 12, 2017, 22 pages.
Han et al., "Situational data integration with data services and nested table", Service Oriented Computing and Applications, vol. 7, No. 2, Apr. 27, 2012, pp. 129-150.
PCT Second Written Opinion in PCT/US2016/060188, dated Sep. 13, 2017, 7 pages.
PCT International Search Report in PCT/US2017/040251, dated Dec. 18, 2017, 14 pages.
"Creating Compound Objects (Documents, Monographs Postcards, and Picture Cubes)", Retrieved From: https://mediawiki.middlebury.edu/wikis/LIS/images/b/bd/Compound-wizard.pdf, Retrieved Date: Sep. 2, 2010, 34 Pages.
"Non Final Office Action Issued in U.S. Appl. No. 15/340,251", dated Aug. 10, 2018, 17 Pages.
"Non Final Office Action Issued in U.S. Appl. No. 15/340,374", dated Sep. 7, 2018, 10 Pages.
"Non Final Office Action Issued in U.S. Appl. No. 15/340,422", dated Sep. 26, 2018, 11 Pages.
"Advisory Action Issued in U.S. Appl. No. 15/340,187", dated Mar. 26, 2019, 5 Pages.
"Non-Final Office Action Issued in U.S. Appl. No. 15/340,187", dated May 1, 2019, 60 Pages.
"Final Office Action Issued in U.S. Appl. No. 15/340,374", dated Apr. 5, 2019, 11 Pages.
"Final Office Action Issued in U.S. Appl. No. 15/340,251", dated Mar. 6, 2019, 17 Pages.
"Final Office Action Issued in U.S. Appl. No. 15/340,422", dated Feb. 11, 2019, 12 Pages.
"Final Office Action Issued in U.S. Appl. No. 15/340,187", dated Jan. 2, 2019, 52 pages.
"Non-Final Office Action Issued in U.S. Appl. No. 15/340,201", dated Jan. 2, 2019, 14 pages.
"PCT International Preliminary Report on Patetability in PCT/US2017/040251", dated Jan. 1, 2019. 8 pages.
"Final Office Action Issued in U.S. Appl. No. 15/340,201", dated Jul. 11, 2019, 15 Pages.
"Notice of Allowance Issued in U.S. Appl. No. 15/340,422", dated Jun. 10, 2019, 6 Pages.
"Notice of Allowance Issued in U.S. Appl. No. 15/340,187", dated Sep. 18, 2019, 9 Pages.
"Non Final Office Action Issued in U.S. Appl. No. 15/340,251", dated Oct. 3, 2019, 19 Pages.
Zarowin, Stanley, "Hiding Cells in Excel-just One or Two or Even 100 at a Time", In Journal of Accountancy, Oct. 1, 2008, pp. 1-2.
"Non Final Office Action Issued in U.S. Appl. No. 15/340,201", dated Apr. 24, 2020, 16 Pages.
"Final Office Action Issued in U.S. Appl. No. 15/340,251", dated Apr. 17, 2020, 8 Pages.
"Final Office Action Issued in U.S. Appl. No. 15/340,201", dated Sep. 22, 2020, 16 Pages.
"PhotoSpread Quick User's Manual", Retrieved From: http://web.archive.org/web/20110708161116/http://infolab.stanford.edu/~paepcke/shared-documents/PhotoSpread/photospreadManual010309.pdf, Jul. 8, 2011, 7 Pages.
"Office Action Issued in European Patent Application No. 16798045.7", dated Jan. 28, 2021, 8 Pages.
Kandel, et al., "PhotoSpread: A Spreadsheet for Managing Photos", In Proceedings of the SIGCHI Conference on Human Factors in Computing Systems, Apr. 5, 2008, pp. 1749-1758.
Kandel, et al., "The PhotoSpread Query Language", Retrieved from: http://ilpubs.stanford.edu:8090/812/1/2007-27.pdf, Sep. 6, 2007, 14 Pages.
"Non Final Office Action Issued in U.S. Appl. No. 16/806,977", dated Jan. 28, 2021, 23 Pages.
"Non Final Office Action Issued in U.S. Appl. No. 15/340,201", dated Mar. 17, 2021, 19 Pages.
"First Office Action Issued in Chinese Patent Application No. 201680063934.7", dated Mar. 10, 2021, 12 Pages.

* cited by examiner

ENRICHED COMPOUND DATA OBJECTS

CROSS-REFERENCE TO RELATED APPLICATIONS

The present application claims priority to U.S. Provisional Application Ser. No. 62/357,327, filed Jun. 30, 2016 and entitled "Enriched Compound Data Objects;" U.S. Provisional Application Ser. No. 62/249,869, filed Nov. 2, 2015 and entitled "Rich Data Types;" U.S. Provisional Application Ser. No. 62/357,284, filed Jun. 30, 2016 and entitled "Rich Data Types;" U.S. Provisional Application Ser. No. 62/249,884, filed Nov. 2, 2015 and entitled "Compound Data Objects;" and U.S. Provisional Application Ser. No. 62/357,292, filed Jun. 30, 2016 and entitled "Compound Data Objects," the disclosures of which are incorporated herein by reference in their entirety.

BACKGROUND

Spreadsheet applications are used to organize and store data. Data is typically stored in a plurality of cells, wherein each cell holds a single value (e.g., a string, number, or error). Data is typically organized within columns and rows, such that related values are stored within the same row or column of the spreadsheet. In some embodiments, columns or rows may each include a header cell that stores a heading or description of the values stored within that row or column. Because only a single value is stored in a single cell, spreadsheets can become extensive and cumbersome, especially if one or more related values are stored in adjacent or nearby cells. This type of organization oftentimes leads to large, complex spreadsheets, which may be difficult to consume and comprehend. Still further, imported data may also be stored in multiple cells, across several rows or columns. For example, data copied from an application or website may be pasted into the spreadsheet, however such pasting is typically done haphazardly, wherein data is organized in cells at random. Accordingly, such data oftentimes must be manually moved to one or more appropriate cells, formatted, or deleted altogether.

It is with respect to these and other general considerations that embodiments have been described. Although relatively specific problems have been discussed, it is understood that the embodiments should not be limited to solving the specific problems identified in the background.

SUMMARY

The present disclosure is directed to systems and methods for enriching compound objects with data imported from one or more third party services, databases, and local databases.

In a first aspect, a system comprising: at least one processing unit; and at least one memory storing computer executable instructions that, when executed by the at least one processing unit, cause the system to perform a method is disclosed. The method comprising: receiving an entry of a value in a cell of a spreadsheet; determining whether the value is related to information provided by a service; based on a determination that the value is related to information provided by the service, selecting the service; displaying a field selection user interface; receiving a selection of one or more fields from the field selection user interface; receiving one or more values associated with the selected one or more fields; and enriching a compound object based on the selected one or more fields and associated one or more values.

In a second aspect, a method for providing enriched data in a spreadsheet of a spreadsheet application is disclosed. The method comprising: receiving an entry of a value in a cell of the spreadsheet; determining whether the value is related to information provided by a service; based on a determination that the value is related to information provided by the service, selecting the service; displaying a field selection user interface; receiving a selection of one or more fields from the field selection user interface; receiving one or more values associated with the selected one or more fields; and enriching a compound object based on the selected one or more fields and associated one or more values.

In a third aspect, disclosed is a computer-readable storage medium storing computer executable instructions that, when executed by at least one processing unit, cause a computing device to: receive an entry of a value in a cell; determine whether the initial value is related to information provided by a service; based on a determination that the value is related to information provided by the service: display a field selection user interface; receive a selection of one or more fields from the field selection user interface; and enrich a compound object based on the selected one or more fields and associated one or more values.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 2 illustrates compound objects stored in a spreadsheet.

FIG. 4 illustrates a spreadsheet storing, in a compound object, information provided by a third party.

DETAILED DESCRIPTION

Figure 1:
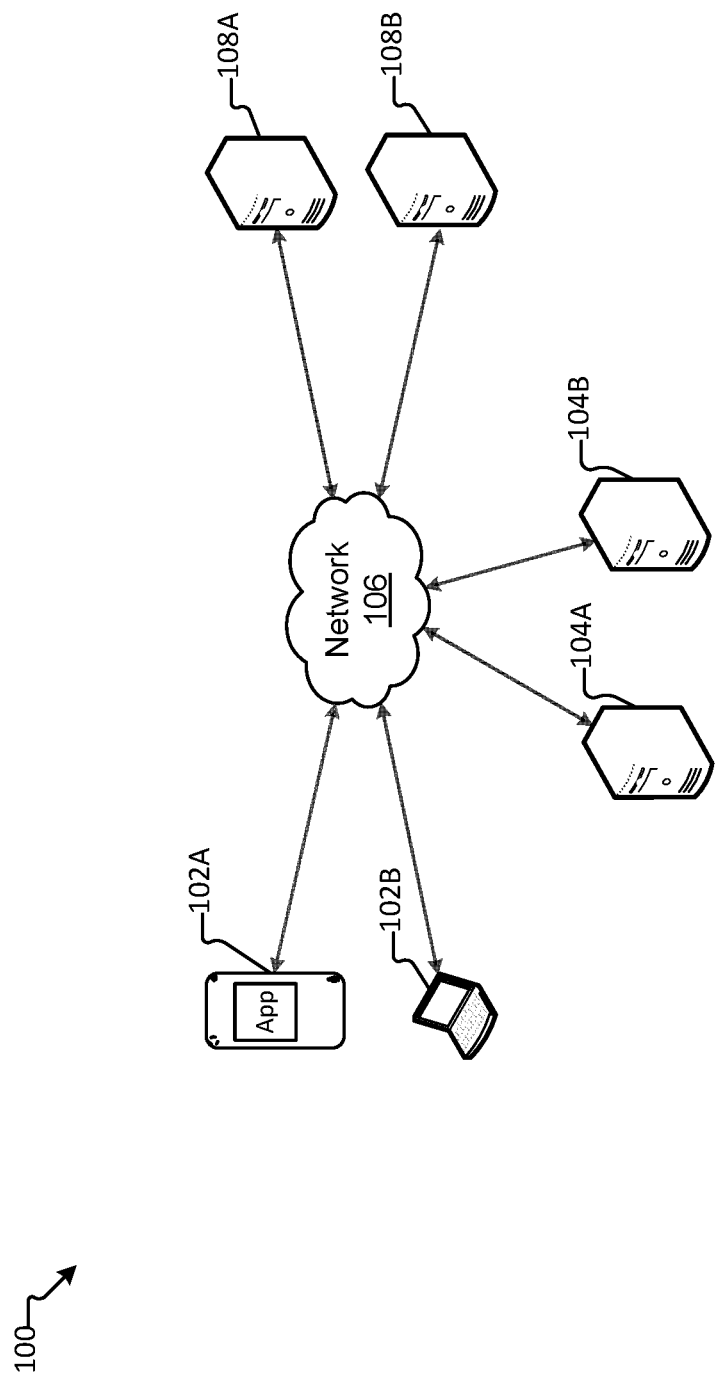
FIG. 1 illustrates a system for implementing compound data types in a spreadsheet application.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

A compound object is an example data value described in U.S. Provisional Application Ser. No. 62/249,884, entitled "Compound Data Objects," and U.S. Provisional Application Ser. No. 62/357,292, entitled "Compound Data Objects," the disclosures of which are incorporated herein by reference in their entirety. A compound object is a value that stores multiple values in a single cell, wherein those multiple values are organized according to a defined structure. The compound object may store multiple values according to a known data structure such as, for example, records, vectors, matrices, tables, and arrays. In other embodiments, the compound object may store multiple values as another data structure, such as, for example, a user-defined data structure. In other embodiments, the compound object may store multiple values as any nested combination of any one of the known data structures (e.g., nesting an array within a vector, or nesting one or more records within a record, or nesting matrices within a table, etc.). The multiple values stored in the compound object are also individually referenceable and can fully participate with spreadsheet functionality including calculations, referencing, and formatting. Compound objects typically store related values. For example, compound objects can store details about a person (e.g., first name, last name, birthdate, address, social security number, etc.), a company (e.g., name, address, phone number, officer names, etc.), a stock (e.g., stock ticker symbol, closing price, average price, volume, dividends, etc.), a product (e.g., product name, price, specifications, description, options, store locations, etc.), a car (e.g., make, model, year, price, colors, image of car, etc.), etc. Although only a few examples are provided, the present disclosure is not intended to be limited to these specific examples. It is understood that compound objects can store virtually any type of information in an efficient and compact manner. Accordingly, compound objects may be used to more efficiently, more logically, more compactly, and more simply store information because multiple values can be stored in a single cell rather than spread across numerous rows and columns of a spreadsheet. The novel aspects of a compound object can therefore reduce the size and complexity of a spreadsheet.

Aspects of the present disclosure further provide the ability to import data from third party sources (e.g., company public or private websites, search engines, etc.) or from internal sources (e.g., databases accessible on an internal network such as the Intranet) and store such imported data in a compound object. An example internal source is a file share, SharePoint, SQL databases, or Analysis Services style (OLAP) data sources. Aspects of the present disclosure are further directed to efficiently and easily importing such data from third party or internal sources. In an example, data from third party sources may be obtained using APIs (REST, SOAP, etc.) to public facing websites or services like Facebook, LinkedIn, or any other site having data. Furthermore, search engines such as, for example, Bing or Google may have APIs that allow users to obtain structured data.

FIG. 1 illustrates a system 100 for implementing compound data types in a spreadsheet application, according to an example embodiment.

As illustrated, system 100 may include one or more client computing devices 102 (e.g., client computing devices 102A and 102B) that may execute a client version of a spreadsheet application capable of storing multiple attributes and values as a compound object in a single cell of a spreadsheet. In some examples, the client spreadsheet application may execute locally on a client computing device 102. In other examples, a client spreadsheet application (e.g., a mobile app on a thin client computing device 102) may operate with a corresponding server version of spreadsheet application executing on one or more server computing devices. In such embodiments, the client computing device 102 may communicate with the corresponding server version of the spreadsheet application over a network (e.g., network 106). In still other aspects, rather than executing a client version of a spreadsheet application, the one or more client computing devices 102 may remotely access, e.g., via a browser over a network (e.g., network 106), the spreadsheet application implemented on a server computing device or multiple server computing devices (e.g., in a distributed computing environment such as a cloud computing environment).

In a basic configuration, the one or more client computing devices 102 are personal or handheld computers having both input elements and output elements operated by one or more users. For example, the one or more client computing devices 102 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing devices as described herein may communicate with some components of the system via a local network (e.g., an enterprise intranet), whereas such server computing devices may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application may be configured to store, in a single cell of a spreadsheet, a compound object having multiple attributes and associated values. As should be appreciated, while examples and descriptions provided below may generally reference storing, in a single cell of a spreadsheet, a compound object having multiple values, the methods and systems described may similarly be applied to multiple compound objects stored in multiple cells. In cases where application of the methods or systems may differ, additional disclosure will be provided.

As should be appreciated, a compound object may include values comprising one or more of: character strings, numbers, images, graphs, charts, and the like. In other embodiments, a compound object may include values such as audio files and video files. In aspects, a compound object may reference values in a structured format (e.g., attribute-value pairs). In aspects, when a compound object is stored in a cell, an image (e.g., an image of a car) stored in the compound object may be displayed in the cell alongside one or more additional values stored in the compound object.

As further illustrated, the client computing device 102 may be connected to one or more local databases (e.g., local database 104A and 104B) storing information that can be imported by the client computing device 102. The local database 104 may be a local database accessible over, for example, a local area network (e.g., network 106). The local database 104 may be maintained and operated by a local party affiliated with the client computing device 102 and can store information that can be imported by the spreadsheet application. The databases could also be located on the same device 102 as the spreadsheet, such as, for example, a database locally stored on a user's desktop.

As further illustrated, the client computing device 102 may be connected to one or more third party databases (e.g., database 108A and 108B) storing information that can be imported by the client computing device 102. The third party database 108 may be accessible over, for example, a Wide Area Network such as the Internet (e.g., network 106). The third party database 108 may be maintained and operated by any third party company or organization and may store information that can be imported by the spreadsheet application.

In some embodiments, the local database 104 or the third party database 108 may provide a field selection user interface, as will be described in further detail herein. In some embodiments, the field selection user interface enables the selection of one or more attributes and associated values that are stored in the respective database and may be imported into the spreadsheet application and stored in a compound object therein. Yet in other embodiments, the selection user interface is provided by the spreadsheet application.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
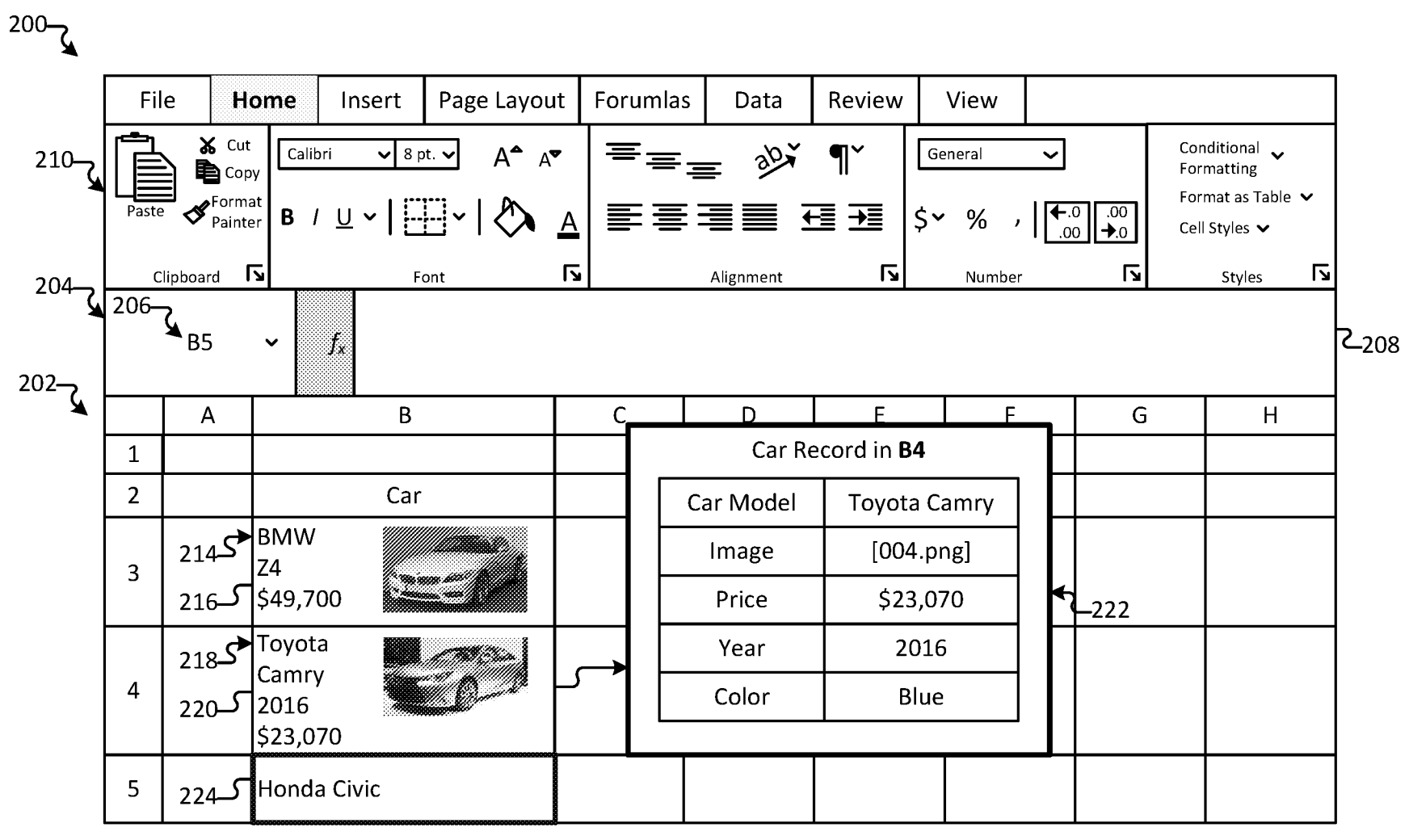

FIG. 2 illustrates compound objects stored in a spreadsheet.

As illustrated, an interface 200 of a spreadsheet application is provided. Interface 200 includes a spreadsheet having a plurality of cells 202, a navigation ribbon 204 (including a cell identifier 206 and a formula bar 208), and a toolbar 210. In some embodiments, the toolbar 210 is part of the navigation ribbon 204. Interface 200 further includes a plurality of tabs 212 for accessing various aspects and operations of the spreadsheet application.

A compound object, as defined herein is a data type that stores multiple values in a single cell, wherein those multiple values are organized according to a defined structure. The compound object may store multiple values according to a known data structure such as, for example, records, vectors, matrices, tables, and arrays. In other embodiments, the compound object may store multiple values as another data structure, such as, for example, a user-defined data structure. In other embodiments, the compound object may store multiple values as any nested combination of any one of the known data structures (e.g., nesting an array within a vector, or nesting one or more records within a record, or nesting matrices within a table, etc.). The multiple values stored in the compound object are also individually referenceable and can fully participate with spreadsheet functionality including calculations, referencing, and formatting. A compound object type is a user defined compound object that has a definition expressed by a schema. The schema identifies the structured organization of the data (e.g., record, matrix, table, vector, array, or other data structure) and any properties of the compound object. As will be described herein, for compound objects that are enriched by local or third party databases, that compound object may follow a different pattern. One example might be a field documenting the connection, a field documenting the query, and a third detailing the list of attributes to convey. Accordingly, as will be described in detail herein, the present spreadsheet application discloses that a cell can store more information, which represents the object.

Because compound objects can store multiple values, and even nested values, in a single cell, not all values can always be fully displayed from the cell view of the cell in which the compound object is stored. Accordingly, based on the number of values stored in the compound object, the size of the card view, or any display preferences, a full or partial view of the compound object may be displayed in the cell view. Accordingly, based on a selection of the compound object, for example, a card view of the compound object can be displayed. The card view may display, for example, a header indicating the type of the compound object and the cell in which the compound object is stored, each value stored in the compound object, and each associated attribute. In some embodiments, the card view displays the compound object as a table organized in attribute-value pairs, wherein each value and associated attribute is stored as a row of the table.

Illustrated is a first compound object 214 stored in cell B3 216 and a second compound object 218 stored in cell B4 220. As illustrated in this example, the first compound object 214 and second compound object 218 each store a record of a car having multiple values. In this example, the first compound object 214 stores four values in attribute-value pairs: (1) Car Make: BMW; (2) Car Model: Z4; (3) Price: $49,700; and (4) Image: [Image of car]. The second compound object 218 stores six values in attribute-value pairs: (1) Car Make: Toyota; (2) Car Model: Camry; (3) Year: 2016; (4) Price: $23,070; (5) Image: [Image of car]; and (6) Color: Blue. As described herein, the cell view of the cell in which the compound object is stored may not always display each value stored in the compound object. In the example illustrated, both the first compound object 214 and the second compound object 218 only display, in the cell view, values and do not display the associated attributes. In particular, the first compound object 214 only displays, in the cell view, four values (e.g., "BMW," "Z4," "$49,700," and an image of the car) and no attributes. The second compound object 218 only displays, in the cell view, five values (e.g., "Toyota," "Camry," "2016," "$23,070," and an image of the car) and no attributes. Still further, as illustrated the example card view 222, the second compound object 218 displays an additional attribute-value pair (e.g., the attribute "Color" and associated value "Blue") that is not displayed in the cell view. In some embodiments, the card view is an adjustable display and therefore may be resized to display more or fewer values.

As illustrated in this example, the first compound object 214 and second compound object 218 each store a record of a car having multiple values. Aspects of the present disclosure provide the ability to import data and store data as a new compound object or within an existing compound object. In an example, as illustrated with reference to FIG. 1, the client computing device (e.g., client computing device 102A or 102B) on which a spreadsheet application is executed may be connected to one or more third party databases (e.g., third party database 108A or 108B) and one or more third party services that store and provide data (e.g., one or more values as well as header information, attributes, etc.). Such third party data can be imported by the client computing device and stored in a spreadsheet as a new compound object or within an existing compound object. Further aspects of the present disclosure provide the ability to import data from a local database. In particular, the client computing device may be additionally or alternatively connected to one or more local databases (e.g., local database 104A and 104B) that store data (e.g., one or more values as well as header information, attributes, etc.). Such local data can be imported by the client computing device and stored in a spreadsheet as a new compound object or within an existing compound object. Although examples described herein may refer to importing data from third party databases, it is understood that such data may similarly be imported and one or more local databases. Still further, although the term database is used, it is understood that a service may also be used with or without the implementation of a database.

Aspects of the present disclosure further provide for the import and storage of data within an existing compound object. In such an example, a user may select one or more fields and corresponding data to be added to an existing compound object from a single service or multiple services. Accordingly, the user may add a new field entitled "customer reviews" to the record of the first compound object 214 illustrated in FIG. 2. This new field may be structured as an array. Accordingly, using an API that connects to a service, the spreadsheet application may call a website that will return an array of reviews for that particular vehicle and store that array of review values within the created field of the first compound object 214.

Furthermore, compound objects that are enriched by local or third party services and databases may include connection and source information. One example might be the inclusion of a field documenting the connection, a field documenting the query, and another field detailing the list of attributes to convey. Accordingly, as will be described in detail herein, the present spreadsheet disclosure provides a compound object that can store additional source information. The corresponding card and cell views may, in some embodiments, show a subset of fields, which may be the usable data that the user wants to see.

Aspects of the present disclosure further provide local or third party services returning values from machine learning. In an example, a service may detect a user's patterns of activity, data insights, data visualizations into one or more compound objects.

Aspects of the present disclosure further provide the automatic detection of known values entered into a cell and the automatic suggestion of one or more third party services, databases, or local databases from which data can be imported as a (or within an existing) compound object. In particular, aspects of the present disclosure provide the automatic detection of known values that can be enriched by information from one or more third party services, databases, or local databases. In some embodiments, in response to receiving an entry of a value, the spreadsheet application may automatically detect the value as a known value (e.g., a known value that may have associated therewith, additional information that can be imported by a third party service, database, or local database) and suggest one or more third party services, databases, or local databases from which to import additional values. There are many ways in which the spreadsheet application can detect or determine known values. In an example, the spreadsheet application may analyze the data stored in the spreadsheet application, including column or row headers, value stored elsewhere in the spreadsheet, etc., to identify values that may be enriched by information provided by a third party service, database, or local database. Additionally or alternatively, the spreadsheet application may identify a pattern of values stored in the spreadsheet to detect known values. For example, the spreadsheet application may identify a known value by identifying the other values or compound objects stored within the same column or row. More particularly, the spreadsheet application may identify one or more values or compound objects stored in the same column or row, each having the same type as the entered value. Additionally or alternatively, the spreadsheet application may identify one or more compound objects stored in the same column or row that store information that was imported by a third party service, database, or local database. Additionally or alternatively, the spreadsheet application may perform string pattern matching to identify a known value. Accordingly, as the user enters in a value, a user interface may be provided as the entered input is matched to a known value. As an example, as the value "kilograms" (including all forms of kilograms such as "kg" or "k") is entered into a cell or to a compound object, the spreadsheet application may recognize the partially provided value (e.g., "kilog") and provide a user interface that prompts the user to accept the fully matched entry (e.g., "kilograms"), or it may automatically accept it. Furthermore, the spreadsheet application may analyze surrounding cells and column or row header cells to infer context about an entered value to recognize that value using an external source and to even obtain additional information from one or more sources. For example, the spreadsheet application may scan the values entered in a spreadsheet, such as values stored in cells or header values to identify context about the data stored therein. Furthermore, the disclosed spreadsheet application may also suggest patterns to match against based on the user's past use of typing patterns, objects previously used, rich values previously used, etc. In other words, the spreadsheet application may apply machine learning techniques to provide suggestions. In an example, if a user has historically written many emails, documents, spreadsheets, etc. about a particular unit compound object, the spreadsheet application may suggest those units of compound objects even if there may be little or no information in the document pertaining thereto. Thus, a user's past use may increase the probability that the spreadsheet application provides suggestions. In other embodiments, the spreadsheet application may also provide suggestions based on other, related users' typing patterns. For example, the spreadsheet application may suggest patterns to match against based on typing patterns, objects previously used, and rich values previously used of another user in the user's work network, family network, friend network, team network, or any other related network. Accordingly, as the user types a value, or in response to cell commit, the spreadsheet application can call an API to a search engine, service, or any service that provides machine learning to obtain high confidence search results for that value in the search engine's internal store. In some examples, search engines or services store well-known entity values in an internal store. If, based on a contextual understanding of the values stored in the spreadsheet, one or more high confidence search results are detected, the spreadsheet application can provide a user interface showing those results and may also provide the option to import related data to the spreadsheet as a compound object or within an existing object.

In yet another aspect, the spreadsheet application may use known values stored in one or more compound objects to automatically obtain additional information from a third party service, database, or local database and augment that compound object with the obtained information. In an example, one or more compound objects storing values associated with a known car entity may be stored in cells of a column under the header value "car." The known car entity may have numerous fields such as, for example, make, model, year, color, safety rating, price, tire, etc. The one or more compound objects may include one or more of these fields. In an example, the one or more compound objects might only store the values associated with the fields make, model and year. Accordingly, if, for example, the user types, as the next column header, a value that matches a known field of the known car entity, then the values within that next column may automatically be populated with relevant information from a data source. Even more, the populated values may be automatically added to each compound object. Continuing the example from above, if the user types "tire" in the column header next to "car," wherein the value "tire" is a known field of the car entity in the internal store, the spreadsheet application can automatically populate the cells within that column with the one or more values associated with 'tire' for each car, wherein the one or more values are obtained from the data source. Moreover, the "tire" value may be added, within a new field, to one or more of the car compound objects. Additionally, each cell within the next column displaying the populated tire values may have a formula referring to the actual value stored in the compound object, such as, for example, "=A2.Tire." In this example, "A2.tire" refers to value associated with the tire attribute (or header) of the compound object stored in cell A2. Accordingly, the spreadsheet application can display the related data in the spreadsheet and it can also augment a compound object with enriched data.

In addition to auto detection, known values may additionally or alternatively be identified through a user interface. For example, the user can, from a user interface for a particular cell, request the spreadsheet application to search for a known entity from a third party service, database, or local database that matches the entered value. Alternatively or additionally, the user may define a formula that maps to a compound object. In an example, the formula "=Bing ("Obama")" may return a compound object for the match to the search term "Obama" using the Bing search engine, which returns, for example, values relating to the president.

The spreadsheet application can additionally or alternatively identify known values based on, for example, matching patterns/strings, analyzing row and column headers, identifying the presence of other entities the user may have previously accepted (e.g., if there is already a "car" compound object somewhere in the spreadsheet, and the user types "Honda," it is likely a car). Furthermore, as the user types one or more new header values, for example, the spreadsheet application can analyze those values to determine if those values correspond to fields in one of the compound objects. Additionally or alternatively, the spreadsheet application can identify if the value corresponds to a value about which a service may have information.

The spreadsheet application may also leverage a certain data type that is associated with a value (e.g., a rich data type) or that is applied to a cell that does not have a value stored therein. Accordingly, for a person data type applied to a cell, the spreadsheet application can be more confident in trying to match to online services, for example, that can return people objects.

Referring back to FIG. 2, as illustrated in this example, the single value "Honda Civic" is provided in cell B5 224, within the same column (e.g., column B) of the first compound object 214 (e.g., stored in cell B3) and the second compound object 218 (e.g., stored in cell B4). The value "Honda Civic" entered in cell B5 224 is the name of a car while the first compound object 214 and second compound object 218 each store a record of a car having multiple values. The first compound object 214 or the second compound object 218 may have been imported from a third party service, database, or local database. Alternatively, the first compound object 214 or the second compound object 218 may have been entered (e.g., typed) and therefore not imported. Based on an any of the methods described herein, the spreadsheet application may identify the value "Honda Civic" as being a known value (see above, for example, by analyzing surrounding cells and header values to identify it as an entity within a search engine store) that may be enriched with further information provided by a third party service, database, or local database. Accordingly, imported data may be stored in the spreadsheet as a compound object, or in other embodiments, it may be stored in an existing compound object. In other embodiments, one or more known values may be imported and stored in one or more cells and not as a compound object. Users may have the ability to import values by selecting desired fields, as will be described in further detail with reference to FIG. 3. In this example, based on a determination that "Honda Civic" is a known entity of a service such as, for example, a Bing search engine data store, the user may select one or more fields that correspond to data to import into the spreadsheet (e.g., make, model, year, price, color options, safety rating, etc.).

Aspects of the present disclosure further provide the ability to search for or select from a pre-populated list of one or more third party services, databases, or local databases from which data can be imported. In some embodiments, a user interface may provide the capability to search for whether an entered value can be enriched with information by a third party service, database, or local database. In addition to the methods described herein, in another example there may be a user interface that provides a list of connections to data, or results from different data sources, and allows a user to select a data source. In other examples, if the spreadsheet already has an existing query or connection to a data source, the spreadsheet application may suggest that data source for other entries. Additionally, if a user has connected to a data source in the past to obtain data to be stored as a compound object or imported to an existing compound object, the spreadsheet application may suggest it to the user, for example, at a later time. Aspects of the present disclosure further extend to providing suggestions based on data sources that related users (e.g., family, colleagues, friends, related networks) have used.

Figure 3:
FIG. 3 illustrates an example field selection user interface in which attributes and values can be selected to be stored in a compound object.

FIG. 3 illustrates an example field selection user interface in which fields can be selected and corresponding values stored in a compound object.

In some embodiments, an owner of the third party service, database, or local database may provide a field selection user interface 302 from which a user may select one or more fields and corresponding values to import and store as a compound object or within an existing compound object. In some embodiments, the field selection user interface 302 may be an add-in or it may be a hosted web-browser type user interface that is provided by the third party database 108. In other embodiments, the spreadsheet application provides the user interface. Users can accordingly view all the fields and select the desired fields and corresponding values. A user may define a view as a default view for that user, which may be used by other users as well.

The one or more fields and corresponding values provided in the field selection user interface 302 are stored in and provided by the a third party service, database, or local database. The field selection user interface provides a list of fields related to a particular known entity of the third party database or local database. In some embodiments, the field selection user interface may return a set of top fields and associated values, however in other embodiments all fields and associated values are displayed. Yet in other embodiments, the service or spreadsheet application may have the ability to select and return a default set of fields and values. In yet other embodiments, based on a user's personal settings or previously used views, the service or spreadsheet application may return a similar set of fields and values. Additionally, the service spreadsheet application may provide a set of fields and values based on other user's (e.g., family, colleagues, friends, etc.) views. Based on a selection of one or more fields from the field selection user interface 302, the selected fields and corresponding values are imported to the spreadsheet and stored in the spreadsheet as a compound object or within an existing compound object. Accordingly, the selected fields and corresponding values may be stored as a compound object in a single cell, wherein each value is individually referenceable. In other embodiments, the spreadsheet application may cache the fields and corresponding values returned from the service and save them in the file for offline viewing and interaction. In some embodiments, one or more compound objects may store the values about the connection and fields, and at runtime, the spreadsheet application may obtain the associated values from the database using the connection information.

As described in the example illustrated in FIG. 2, in response to receiving an entry of "Honda Civic," (e.g., in cell B5 224 or even in an existing compound object) a third party service (e.g., Bing), database, or local database may be selected to enrich the entry with additional information. In some embodiments, a field selection user interface (e.g., field selection user interface 302) is provided by the selected third party service, database, or local database. In this example, the field selection user interface 302 provides multiple fields (e.g., "Model," "Image," "Price," "Year," "Manufacturer," "MPG," and "Safety Rating") and corresponding values (e.g., "Honda Civic," "Honda.png," "USD $18,190," "2016," "Honda," "29/38," and "4 Stars") that may be selected to be imported into the spreadsheet and stored in a compound object. As described herein, the field selection user interface provides a list of fields related to a particular known entity of the third party service, database, or local database. As noted in this example, the fields and corresponding values presented in the field selection user interface 302 are provided by the Bing search engine, which is owned and operated by Microsoft Corporation of Redmond, Wash. Although this example illustrates the Bing search engine as the third party service from which additional information provided, aspects of the present disclosure are not intended to be limited to this third party service. In other embodiments, the additional information may be provided by another third party service. For example, the Honda Motor Company itself may provide such additional information in a field selection user interface.

As illustrated in FIG. 3, several fields (e.g., "Model," "Image," "Price," and "Year") and corresponding values (e.g., "Honda Civic," "Honda.png," "USD $18,190," and "2016") displayed in the field selection user interface 302 have been selected. Accordingly, based on a selection of the "OK" button, for example, those fields and associated values may be imported into the spreadsheet and stored therein as a compound object. An example compound object storing such selected information is illustrated and described with reference to FIG. 4. Users may also have the ability to order fields to further personalize cell and card views. Additionally, in some embodiments, nested objects may be returned. For example, for a stock compound object, a user could decide which sub-fields of the stock object the user would like to return. These could come back as a nested object. Or they could show up as top-level fields on the parent object for display/interaction purposes in the workbook.

Figure 4:
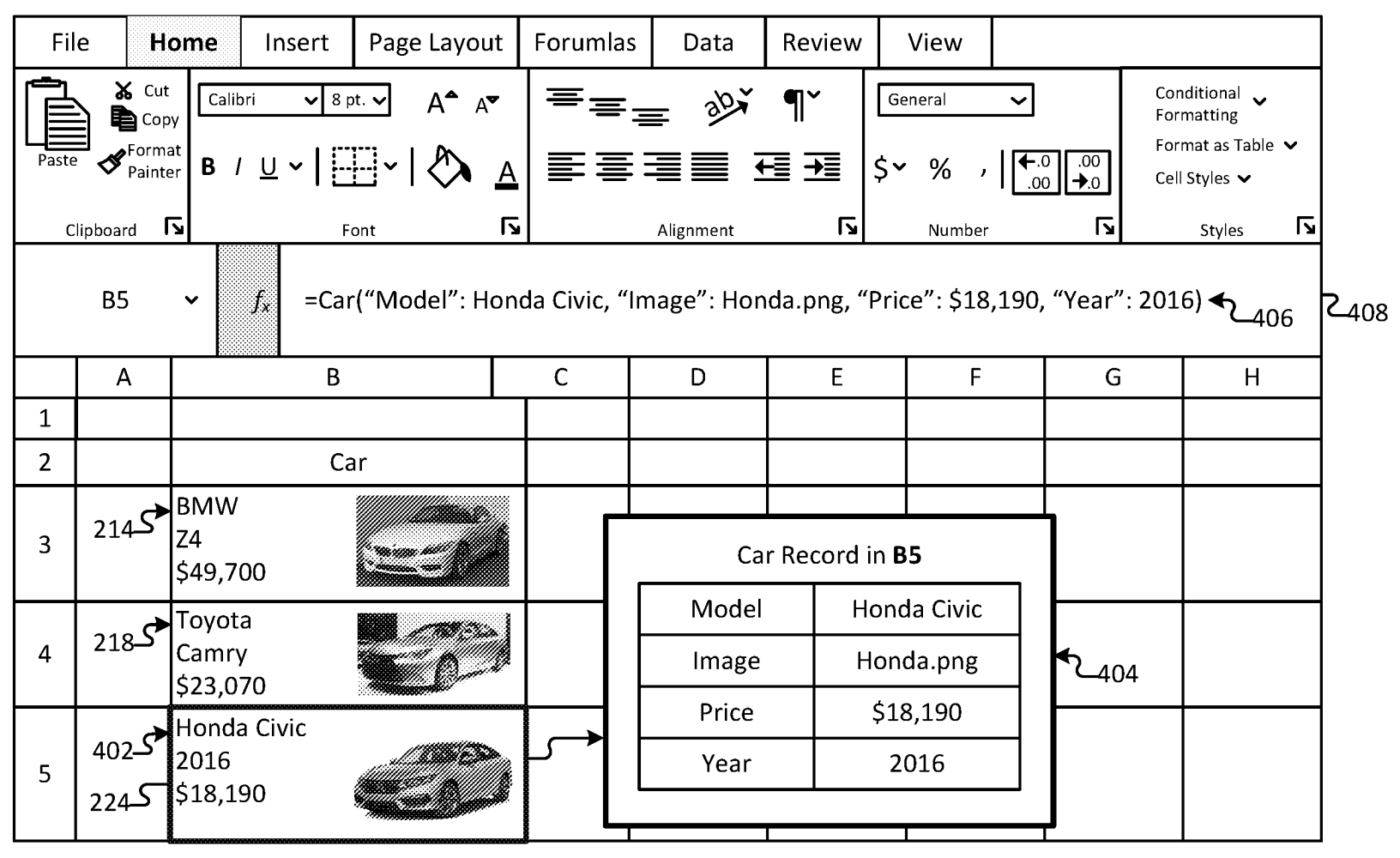

FIG. 4 illustrates a spreadsheet storing, in a compound object, information provided by a third party.

As illustrated, the compound object 402 stored in cell B5 224 now stores a compound object having multiple values relating to a car and organized according to a record data structure. In this example, the compound object 402 has multiple attributes (e.g., "Model," "Image," "Price," and "Year") and associated values (e.g., "Honda Civic," "Honda.png," "USD $18,190," and "2016"). As illustrated and described with reference to FIG. 3, these attributes and associated values were selected from an field selection user interface (e.g., field selection user interface 302). Based on the selection of attributes from the field selection user interface, the corresponding values were imported and stored in the spreadsheet as compound object 402, wherein each value is individually referenceable.

In this example, the compound object 402 also fully participates as a compound object in the spreadsheet. For example, the compound object 402 may be displayed in a card view (e.g., card view 404). In this example, the card view 404 of compound object 402 includes a header that displays the name of the compound object (e.g., "Car"), the data structure by which the values are organized (e.g., "Record"), and the cell in which the compound object is stored (e.g., cell "B5"). The card view 404 further includes each value (e.g., "Honda Civic," "Honda.png," "USD $18, 190," and "2016") and associated attribute (e.g., "Model," "Image," "Price," and "Year") organized in an attribute-value pair table. In some embodiments, the compound object may be editable from the corresponding card view.

Alternatively or additionally, values imported from a third party service, database, or local database may be stored in a compound object with additional information provided by the user. In the example illustrated in FIG. 4, the compound object 402 could be further modified with user-provided data. For example, the user may add a "My Rating" field wherein the corresponding value may be the user's personal notes about the particular vehicle. Accordingly, the combination of service enhanced data and personal data allows users to create custom solutions.

The compound object 402 may also be represented as a formula (e.g., formula 406) displayed in the formula bar (e.g., formula bar 408). In this example, the compound object 402 is represented by formula 406 (e.g., "=Car ("Model": Honda Civic, "Image": Honda.png, "Price": $18, 190, "Year": 2016)"). In some embodiments, the compound object may be editable from the corresponding formula. Accordingly, it is understood that the compound object including values and attributes imported from a third party service, database, or local database may fully participate as a compound object in the spreadsheet.

In other embodiments, the formula may define the connection to the third party service, database, or local database. In such an example, the formula may be represented as, for example, "=Bing("Honda Civic", {Model, image, price, year})." Another formula could then refer to this cell as "=B5.model." The array parameter in the =Bing( ) function could be used to specify the fields the user has set. In another embodiment, the formula "=Bing("Honda Civic")" could be used, wherein the fields do not surface in the formula or cell views, but are instead stored in metadata.

Alternatively or additionally, the corresponding formula may just indicate source information, an icon or image indicating the compound object includes imported information, or other such identifying information instead of a formula definition of the values.

Furthermore, the values imported from the third party service, database, or local database may be updated as the information stored in the underlying database changes. In some embodiments, such values stored in the compound object may be updated based on a request made by the user to the third party service, database, or local database. In other embodiments, the third party service, database, or local database may automatically update the one or more values stored in a compound object. Yet in other embodiments, the third party service, database, or local database may send a message or alert to the spreadsheet application indicating that the information it had previously provided has since changed.

Figure 5:
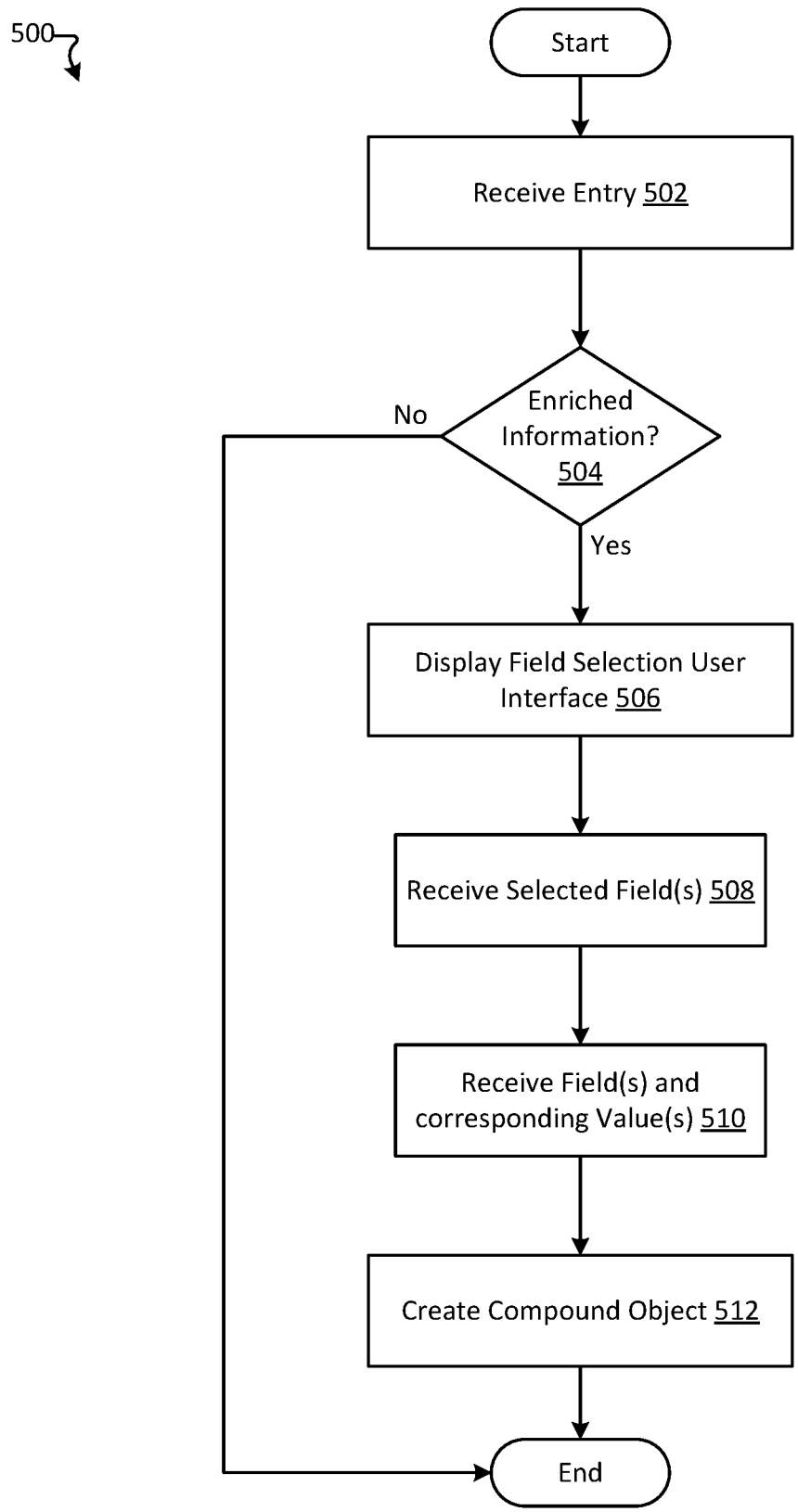
FIG. 5 illustrates a method for importing information from a third party or local database and storing that information as a compound object in a spreadsheet.

FIG. 5 illustrates a method for importing one or more values from a third party service, database, or local database and storing those values as a compound object in a spreadsheet.

The method 500 beings at a start operation. Thereafter, the method flows to the receive entry operation 502. In the receive entry operation 502, for example, the spreadsheet application receives an entry in a cell. For example, the spreadsheet application may receive a string or numerical value in a cell. In other embodiments, the spreadsheet application may receive an image, graph, or chart. Alternatively or additionally, the spreadsheet application may receive, as an entry, a compound object that already exists, a map, a reference to a cell or field that has a connection (e.g., if a user begins constructing a compound object and a value for one of its fields references some other cell or compound object in the spreadsheet that is connected to a data source), or a special formula that indicates a compound object is requested from a service. In other embodiments, the user may use a user interface create or insert a compound object. The entry may be a standalone entry within that cell or it may be within an existing compound object stored in that cell.

In the enriched information decision operation 504, the spreadsheet application determines whether the entry received in the receive entry operation 502 can be enriched by information provided from a third party service, database, or local database. In some examples, this may be done by the automatic detection of known values that can be enriched by information from a third party service, database, or local database. Yet in other embodiments, a user may select, from a user interface, a third party service, database, or local database from which to import additional information. If there are no third party services, databases, or local databases that can enrich the entry, or alternatively, if the user selects an option not to enrich the entry (e.g., 'NO' decision), the method 500 ends. If, however, a third party service, database, or local database is selected (e.g., 'YES' decision), the method 500 proceeds to the display field selection user interface operation 506.

In the display field selection user interface operation 506, a field selection user interface is displayed. An example field selection user interface is illustrated and described with reference to FIG. 3 (e.g., field selection user interface 302). In an example, based on a selection of a third party service, database, or local database, a corresponding field selection user interface may be displayed. In some embodiments, the field selection user interface may be provided by the third party service, database, or local database. In other embodiments, the field and value information is provided by the spreadsheet application. In an example, the field selection user interface (e.g., field selection user interface 302) may display one or more fields and associated values that may be selected to be imported into the spreadsheet and stored therein as a new compound object or within an existing compound object. In some embodiments, this step is optional in the example in which default fields and corresponding values are imported.

In the receive selection of fields operation 508, a selection, at the field selection user interface, of one or more fields is received. In some embodiments, one or more fields are received, wherein the fields are each associated with at least one corresponding value. However, in other embodiments, one or more values are received, which may or may not be associated with a field.

In the receive selected fields operation 510, the one or more fields and corresponding values selected from the field selection user interface in operation 508 are received. In particular, the fields and values may be imported from the third party service, database, or local database and stored in the spreadsheet as a new compound object or within an existing compound object. In other embodiments, the fields and values may be linked to the storage location in which the actual information is stored and therefore not imported into the spreadsheet itself.

In the create compound object operation 512, based on the fields and values received in operation 510, the spreadsheet application may organize and store the fields and values in a compound object. In some embodiments, the data structure of the compound object is selected by the user, and in other embodiments a default structure is used. Additionally, the create compound object operation 512 may create a cell view and a card view of the generated compound object, as illustrated and described with reference to FIG. 2 and FIG. 4. Still further, the create compound object operation 512 may additionally construct a formula definition of the generated compound object.

As should be appreciated, operations 502-512 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, as described herein.

Figure 6:
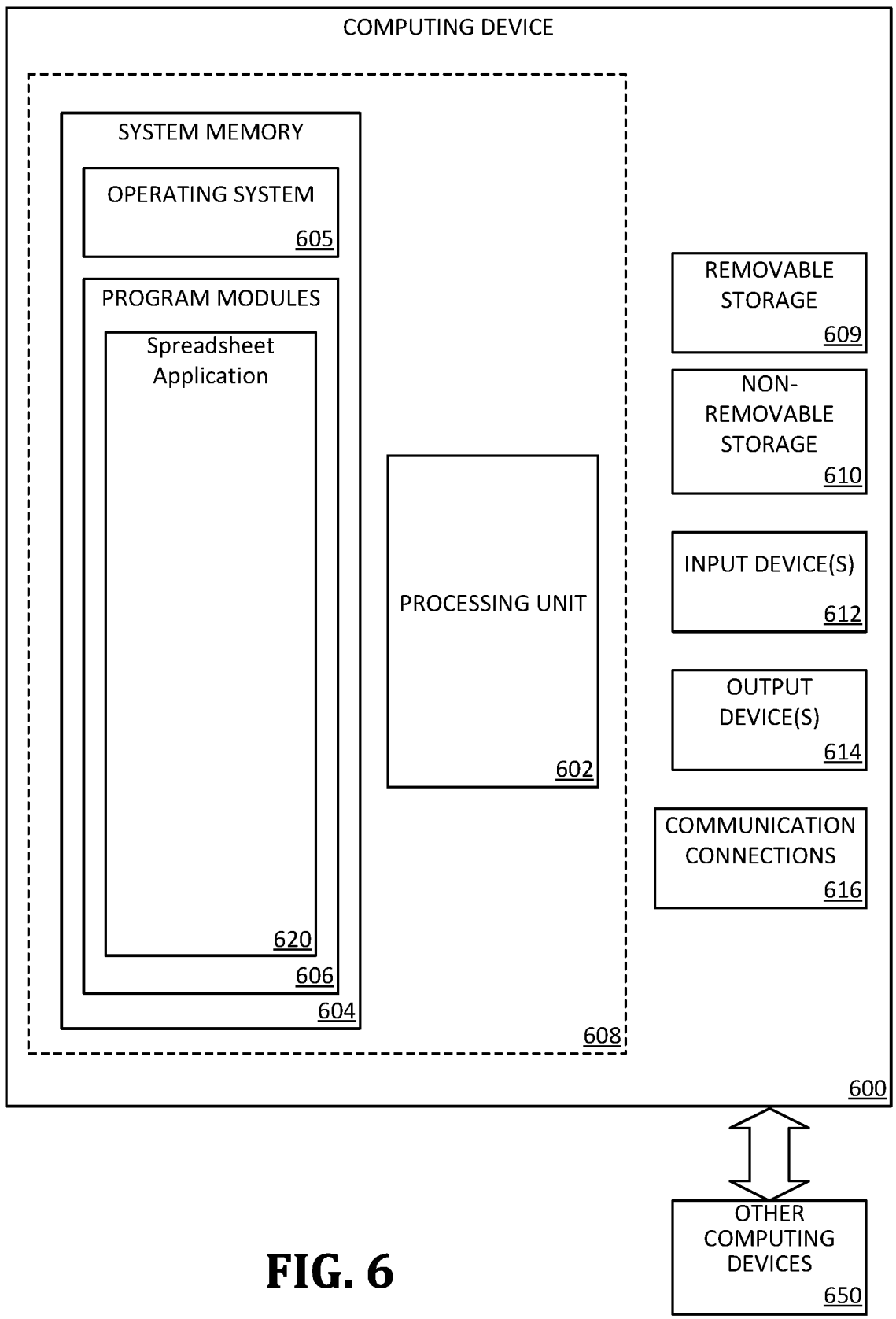
FIG. 6 is a block diagram illustrating physical components of a computing device with which aspects of the disclosure may be practiced.

FIG. 6 is a block diagram illustrating physical components (e.g., hardware) of a computing device 600 with which aspects of the disclosure may be practiced. The computing device components described below may have computer executable instructions for implementing a spreadsheet application 620 on a computing device (e.g., server computing device 108 and/or client computing device 104), including computer executable instructions for spreadsheet application 620 that can be executed to implement the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running spreadsheet application 620.

The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610. As stated above, a number of program modules and data files may be stored in the system memory 604. While executing on the processing unit 602, the program modules 606 (e.g., spreadsheet application 620) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
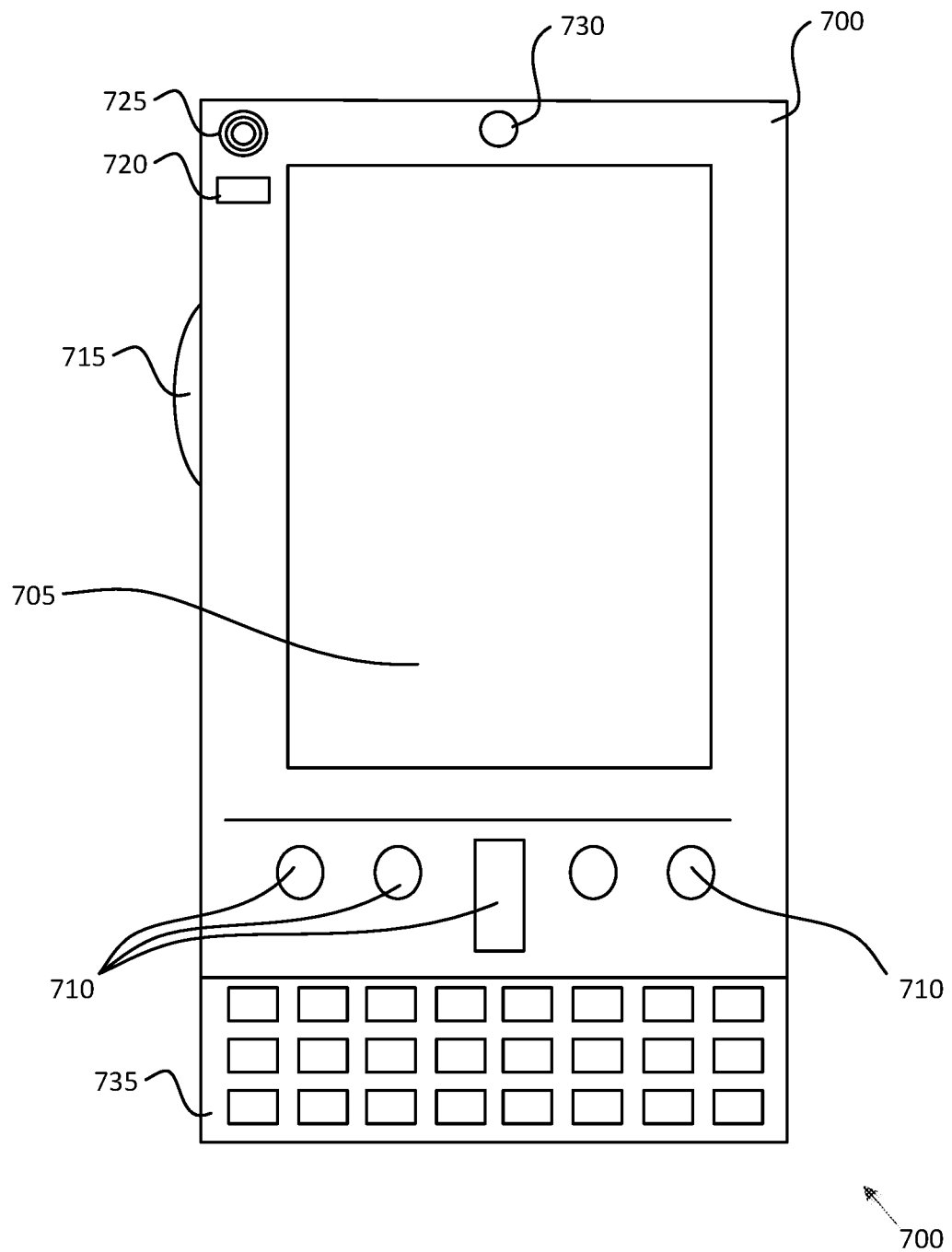
FIG. 7A and FIG. 7B illustrate a mobile computing device, for example, a mobile telephone, a smart phone, wearable computer, a tablet computer, a laptop computer, and the like, with which embodiments of the disclosure may be practiced.
Figure 7B:
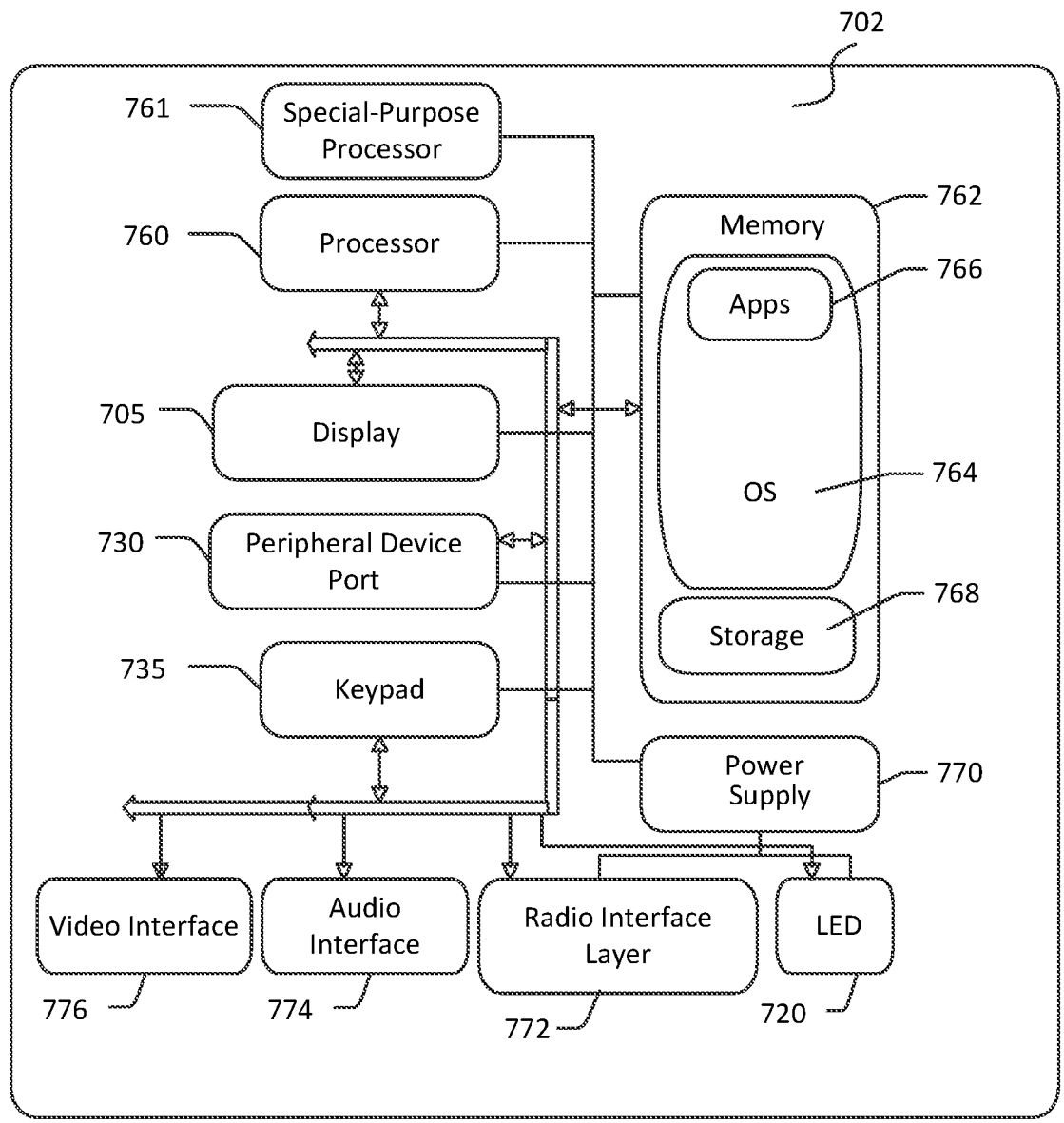

FIG. 7A and FIG. 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as email or other messages used by an email application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for associating one or more images with one or more cells of a spreadsheet as described herein (e.g., attribute component, associate component, array component, hybrid component, operation component, and/or UX component, etc.).

The system 702 has a power supply 770, which may be implemented as one or more batteries. The power supply 770 may further include an external power source, such as an AC adapter or a powered docking cradle that supplements or recharges the batteries. The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via an audio transducer 725 (e.g., audio transducer 725 illustrated in FIG. 7A). In the illustrated embodiment, the visual indicator 720 is a light emitting diode (LED) and the audio transducer 725 may be a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of peripheral device 730 (e.g., on-board camera) to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

As should be appreciated, FIG. 7A and FIG. 7B are described for purposes of illustrating the present methods and systems and is not intended to limit the disclosure to a particular sequence of steps or a particular combination of hardware or software components.

Figure 8:
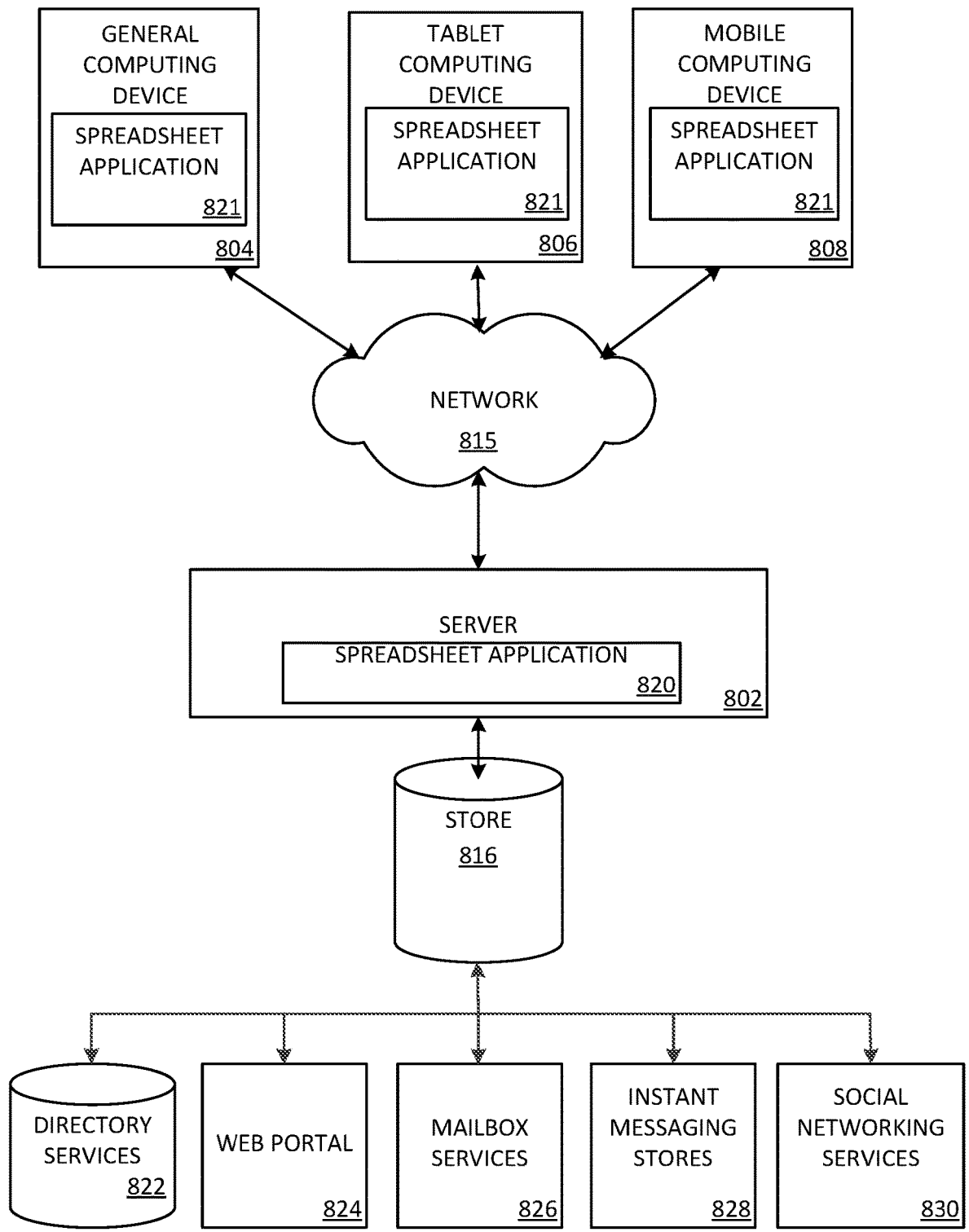
FIG. 8 illustrates one aspect of the architecture of a system for processing data received at a computing system from a remote source, such as a general computing device, tablet computing device, or mobile computing device.

FIG. 8 illustrates one aspect of the architecture of a system for processing data received at a computing system from a remote source, such as a general computing device 804 (e.g., personal computer), tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking service 830. The spreadsheet application 821 may be employed by a client that communicates with server device 802, and/or the spreadsheet application 820 may be employed by server device 802. The server device 802 may provide data to and from a client computing device such as a general computing device 804, a tablet computing device 806 and/or a mobile computing device 808 (e.g., a smart phone) through a network 815. By way of example, the computer system described above may be embodied in a general computing device 804 (e.g., personal computer), a tablet computing device 806 and/or a mobile computing device 808 (e.g., a smart phone). Any of these embodiments of the computing devices may obtain content from the store 816, in addition to receiving graphical data useable to either be pre-processed at a graphic-originating system or post-processed at a receiving computing system.

As should be appreciated, FIG. 8 is described for purposes of illustrating the present methods and systems and is not intended to limit the disclosure to a particular sequence of steps or a particular combination of hardware or software components.

Figure 9:
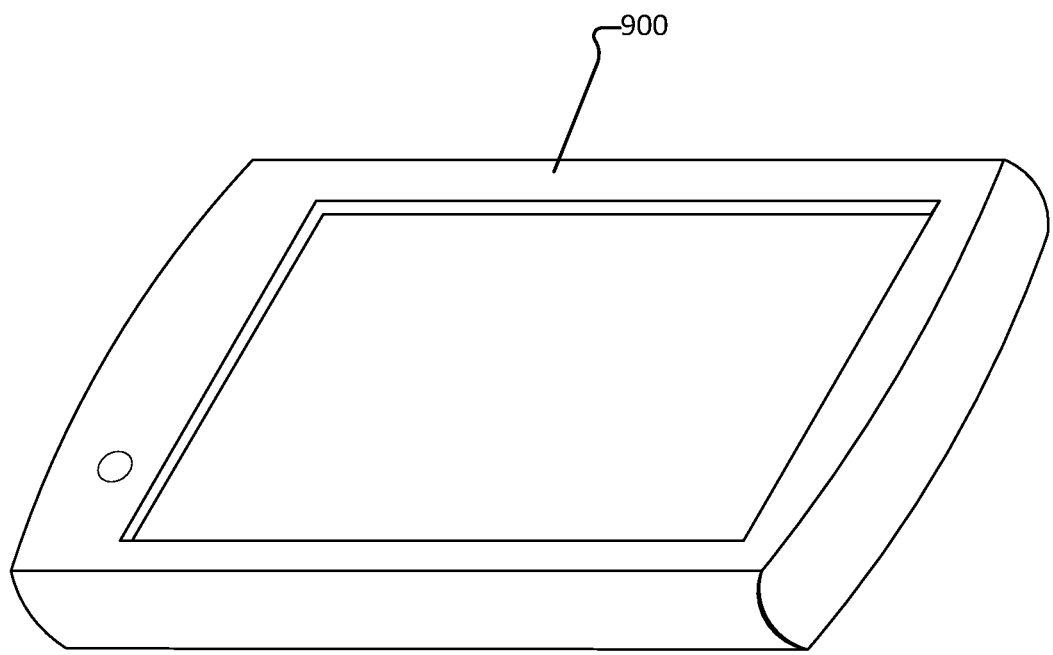
FIG. 9 illustrates an exemplary tablet computing device that may execute one or more aspects disclosed herein.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processing unit; and
at least one memory storing computer executable instructions that, when executed by the at least one processing unit, cause the system to perform operations of:
receiving a first value in a single spreadsheet cell of a spreadsheet;
receiving, from a service, a corresponding value for each attribute from a plurality of attributes associated with the first value in the single spreadsheet cell;
creating a compound object with a data structure comprising individually referenceable attribute-value pairs that each includes one of the plurality of attributes and the corresponding value for each attribute;
storing the compound object in the single spreadsheet cell; and
providing, for display in the single spreadsheet cell, the first value and at least one of corresponding values.

2. The system of claim 1, wherein the service is a third party service or a local service.

3. The system of claim 1, wherein the memory stores the computer executable instructions that, when executed by the at least one processing unit, further cause the system to perform the operations of:
determining whether the first value is related to information accessible from the service based on at least one of:
analyzing data stored in the spreadsheet,
analyzing header values, or
implementing machine learning techniques.

4. The system of claim 1, wherein the memory stores the computer executable instructions that, when executed by the at least one processing unit, further cause the system to perform an operation of determining whether the first value is related to information accessible from the service based on receiving a request to search for the service.

5. The system of claim 1, wherein the plurality of attributes comprise the attributes of an entity corresponding to the first value.

6. The system of claim 1, wherein the memory stores the computer executable instructions that, when executed by the at least one processing unit, further cause the system to perform an operation of updating the compound object based on at least one of a user request or an automatic setting.

7. The system of claim 1, wherein for creating the compound object, the memory stores the computer executable instructions that, when executed by the at least one processing unit, further cause the system to perform an operation of augmenting an existing compound object based on the corresponding value for each attribute from the plurality of attributes.

8. A method for providing enriched data in spreadsheets of a spreadsheet application, the method comprising:
receiving a first value in a single spreadsheet cell of a spreadsheet;
receiving, from a service, a corresponding value for each attribute from a plurality of attributes associated with the first value in the single spreadsheet cell;
creating a compound object with a data structure comprising individually referenceable attribute-value pairs that each includes one of the plurality of attributes and the corresponding value for each attribute;
storing the compound object in the single spreadsheet cell; and providing, for display in the single spreadsheet cell, the first value and at least one of corresponding values.

9. The method of claim 8, wherein the service is a third party service or a local service.

10. The method of claim 8, further comprising:
determining whether the first value is related to information accessible from the service based on at least one of:
analyzing data stored in the spreadsheet,
analyzing header values, or
implementing machine learning techniques.

11. The method of claim 8, further comprising determining whether the first value is related to information accessible from the service based on receiving a request to search for the service.

12. The method of claim 8, wherein the plurality of attributes comprise the attributes of an entity corresponding to the first value.

13. The method of claim 8, further comprising updating the compound object based on at least one of a user request or an automatic setting.

14. The method of claim 8, wherein the compound object is a new compound object.

15. The method of claim 8, wherein creating the compound object further comprises augmenting an existing compound object based on the corresponding value for each attribute from the plurality of attributes.

16. A computer-readable storage medium storing computer executable instructions that, when executed by at least one processing unit, cause a computing device to perform operations of:
receiving a first value in a single spreadsheet cell;
receiving, from a service, a corresponding value for each attribute from a plurality of attributes associated with the first value in the single spreadsheet cell;
creating a compound object with a data structure comprising individually referenceable attribute-value pairs that each includes one of the plurality of attributes and the corresponding value for each attribute;
storing the compound object in the single spreadsheet cell; and
providing, for display in the single spreadsheet cell, the first value and at least one of corresponding values.

17. The computer-readable storage medium of claim 16, wherein for creating the compound object, further storing the computer executable instructions that, when executed by the at least one processing unit, cause the computing device to further perform an operation of augmenting an existing compound object based on the corresponding value for each attribute from the plurality of attributes.

18. The computer-readable storage medium of claim 16, wherein the corresponding value for a first attribute from the plurality of attributes comprises textual information and the corresponding value of a second attribute from the plurality of attributes comprises an image.

19. The computer-readable storage medium of claim 16, wherein the plurality of attributes comprise the attributes of an entity corresponding to the first value.

* * * * *